United States Patent
Carpenter et al.

(10) Patent No.: US 6,284,094 B1
(45) Date of Patent: Sep. 4, 2001

(54) METHOD FOR RECYCLING BALE OF RECYCLING PAPER

(75) Inventors: Ronald Carpenter; Kathleen Carpenter, both of Canby; Colleen Barth, Mt. Angel; Shannon Russell, Salem, all of OR (US)

(73) Assignee: Western Paper Wire, Inc., Canby, OR (US)

( * ) Notice: Subject to any disclaimer, the term of this patent is extended or adjusted under 35 U.S.C. 154(b) by 0 days.

(21) Appl. No.: 09/577,117

(22) Filed: May 23, 2000

(51) Int. Cl.[7] ............... D21H 11/14; D21B 1/32
(52) U.S. Cl. ............... 162/4; 162/100; 162/196; 428/357; 206/83.5; 100/1
(58) Field of Search ............... 162/4, 100, 201, 162/196; 206/83.5; 100/1; 241/46.17; 428/913

(56) References Cited

U.S. PATENT DOCUMENTS 5,066,363 * 11/1991 Lee et al. ............... 162/100
6,022,618 * 2/2000 Arai ............... 428/357

* cited by examiner

*Primary Examiner*—Dean T. Nguyen
(74) *Attorney, Agent, or Firm*—Robert L. Harrington

(57) ABSTRACT

A paper cord is formed using wet lap paper of about 8" to 11" in width which is twisted into a cord form of about ¼" to ⅜" diameter. The cord is used to bind bales of compressed used paper having a volume of about 100 cubic feet and a weight of about 1,200 pounds. The bales are transported to a recycling pulp mill and placed in pulp making vats where the cord is dissolved to release the paper from the bales and subsequently convert the paper and cord to pulp for production of new paper products.

6 Claims, 1 Drawing Sheet

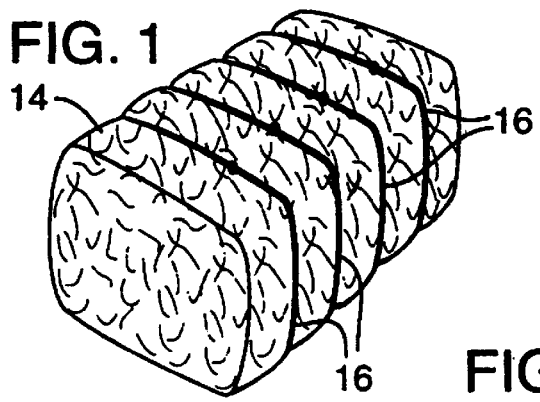
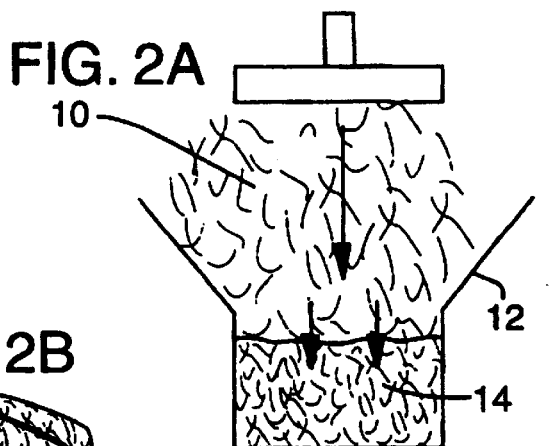
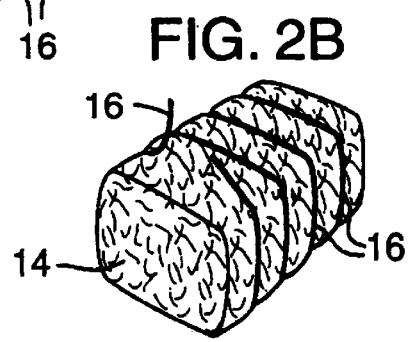
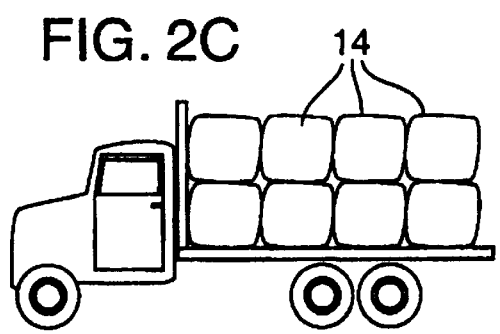
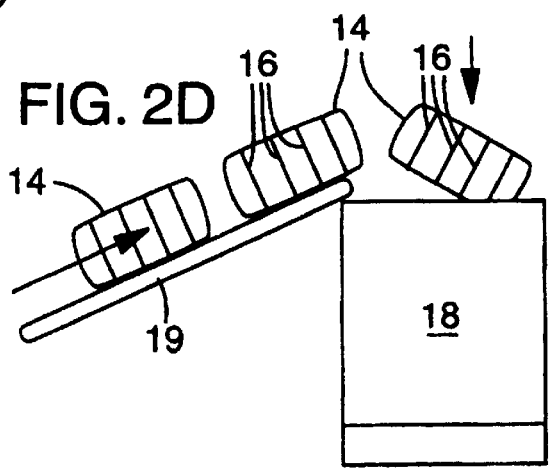
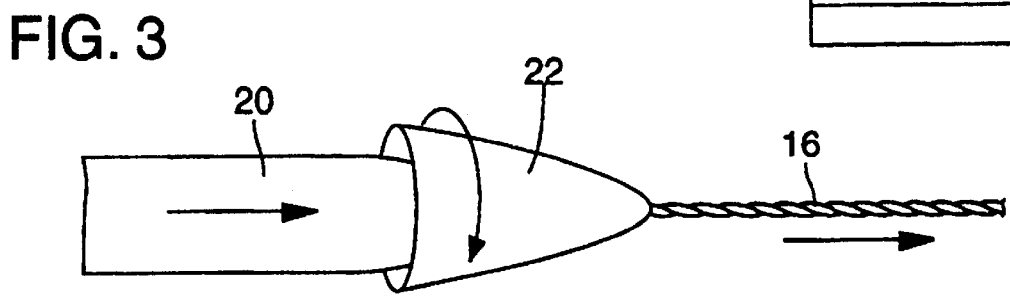
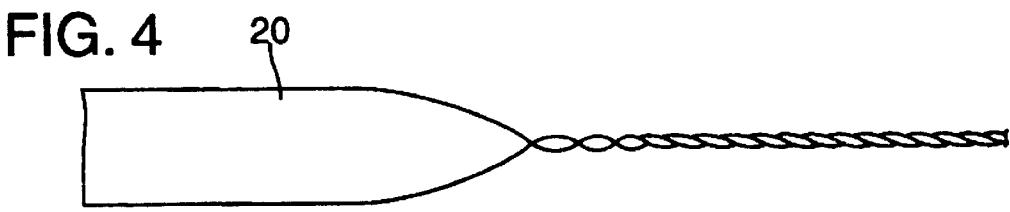

METHOD FOR RECYCLING BALE OF RECYCLING PAPER

FIELD OF THE INVENTION

This invention relates to the processing of recycled paper and more particularly the provision of paper bales using pulp compatible binding for the bales.

BACKGROUND OF THE INVENTION

Recycling paper has become a major industry. Paper of all types is collected at a collection site and compacted into bales that can be efficiently transported to a recycling pulp mill. The baling process typically involves the use of high strength steel wire. The paper is compressed in a compressor and then the wire is wrapped, e.g., in six strands around the bale to hold the bale in the compressed and handleable state. The bales approach, e.g., 100 cubic feet and weigh on the order of 1,200 pounds.

The bales are loaded, e.g., in trucks, using forklift trucks and hauled to the mill site. At the mill site, the wire strands are cut and the paper placed on conveyors to be conveyed to a pulping tank. The pulping tank is typically a continuous process and the paper is rapidly reduced to pulp and then through various follow-up processes, the pulp is cleaned and cycled into the paper making stage.

A major problem with the system described above is the handling of the wire binding. In the first instance, the bales are maintained in a compressed state by the wire strands. As the strands are cut, the wire will snap apart and the whipping wire produces a serious threat to the safety of the bale handlers.

The wire is typically loaded onto the conveyor along with the paper released from the bale. Often one of the strands is not cut so as to assist in handling and in any event, a substantial portion of the wire strands is placed on the conveyor and conveyed into the pulping tank (pulper). The wire strands can and do get wrapped around the pulleys and cogs of the conveyor. The strands that get dumped into the pulping tank get screened out of the pulp but remain in the tank and have to be periodically removed from the pulping tank. The process has to be stopped and the wires removed and collected to subsequently be loaded onto trucks for disposal. Further, the wire while contained in the pulper causes undue wear and tear of the pulper, all at a substantial cost to the recycling process.

BRIEF DESCRIPTION OF THE INVENTION

A solution to the problem as above described is the replacement of the wire with another form of binding. However, adequate replacement binding that was previously known utilized a plastic material that is incompatible with the pulping process and has to be removed before it reaches the pulping stage.

The basic concept of the present invention is the use of a paper binding, i.e., a continuous paper sheeting twisted into cord form. A significant benefit of a paper binding or cord is that the cord can then simply be recycled through the pulping process. Also, the cord can remain secured to the bale, i.e., it is not required to cut prior to pulping, to thereby avoid safety concerns and to avoid having the cord getting wrapped around the pulleys of the conveyor. Once the bales are introduced to the pulp, the high heat, moisture and agitation rapidly degrade the paper cord and releases the paper for pulping in the conventional manner. With the use of the paper cord, there is no need to stop the process for wire removal and the cost of removing, gathering, loading and disposal of the wire strands is eliminated.

The problem with the paper binding (cord) is that heretofore no such paper bindings having the required strength for securing a 1,000 to 2,000 pound compressed paper bale could be located and certainly not in the pulping industry. The binding desired needs to have a tensile strength on the order of 250–300 pounds. Also, paper binding that was available was found to rapidly lose the already inadequate strength it had when exposed to moisture. It is not practical to insure that paper bales will be free of moisture even though moisture content is minimized.

The breakthrough came from a chance observation of a cord binding that was being used for tying hops. It was observed that young boys could climb up and down the binding without breaking the binding. The boys were at least over 100 pounds and the binding was obviously exposed to moisture. Upon investigation, it was learned that the binding was made of twisted strips of U.S. grade wet lap paper. Wet lap paper is itself resistant to moisture and it is theorized that the twisting of the paper strips and the further twisting that results when applying a tensile force, seals the cord interior and prevents significant penetration of moisture. The wet lap paper binding has enhanced strength with up to 8% moisture and doesn't begin to lose that strength until the moisture content exceeds 12%. Baled recycling paper rarely exceeds 12% moisture content and the wet lap paper binding is very acceptable if it can be made strong enough.

Whereas a smooth consistent binding is considered desirable, e.g., to avoid weak points, it was not known how to make the desired binding having the strength required for the paper bales (250–300 pounds). After many attempts at increasing strength, what worked was the use of a wider strip of the wet lap paper (a 35 pound test paper that is 8–10 inches wide as compared to the prior strips having 3–3½ inch width). The machinery for twisting the paper was modified to accommodate the extra width and the twisting process as then applied produced a smooth quarter inch diameter paper binding that achieved the desired 250 pound plus tensile strength. Tests conducted on the paper binding as applied to recycling paper bales established that it indeed securely bound the bales, it retained its strength under moist conditions, e.g., 12%, and it could be placed into the pulping tank where the binding is rapidly dissolved into the pulp and then processed with the pulp with no detrimental affect to the pulp.

The invention will be more fully appreciated upon reference to the following detailed description and drawings referred to therein.

BRIEF DESCRIPTION OF THE DRAWINGS

FIG. 1 is a schematic illustration of a bale of compressed scrap paper secured together by paper cord of the present invention;

FIG. 2 including sub-figures 2A, 2B, 2C and 2D is a diagrammatic illustration of the recycling process;

FIG. 3 is a diagrammatic illustration of the apparatus used for twisting a paper strip into a paper cord; and FIG. 4 is a diagrammatic illustration of a strip of wet lap paper being twisted into a cord.

DESCRIPTION OF THE PREFERRED EMBODIMENT

Paper products are made from wood fiber. Millions of pounds of paper are produced every day to satisfy the public's appetite for paper products. Wood fiber comes from trees and accordingly the process involves cutting down trees, reducing the trees to chips, further processing the chips into wood fiber and then processing the fiber into paper. The paper products produced are largely disposable products, e.g., newspaper, magazines, wrapping paper, etc. The use for such products is short lived. Then the paper is disposed of, e.g., in garbage cans to be hauled to dump sites.

At least two problems result from this voracious appetite for paper. Trees become scarcer and scarcer as they are consumed in huge numbers daily and the dump sites rapidly fill causing greater and greater demand for dump sites.

At least a partial resolution of this problem is the process of recycling paper. Thus the paper is gathered from homes, hauled to recycling stations where the paper is compressed into bales and then hauled in bulk to the recycling mills. The scrap paper is reduced to pulp and remade into paper products.

The present invention addresses one aspect of this overall recycling process. Previously, the compressed scrap paper bales were secured by wire. The wire has to be removed from the bales and removed from the pulp making process. Wire removal is accomplished by cutting the wire which gets buried among the paper scraps and the wire and paper are conveyed to the pulping tank or vat. The tensioned wire snaps apart when cut causing a safety problem. The wire wraps around gears and other components of the conveyor and pulping system and causes a maintenance problem. The wire has to be separated from the pulp, removed from the pulper and hauled away.

A substitute binding for the wire has been identified and tried in the form of a plastic wrap. Plastic bindings create less of a hazard for handlers but it is not compatible with the pulping process and provision has to be made for removing the plastic cord or straps before conveying the paper to the pulping vats. This creates a serious problem for the pulping mills and is undesired.

The invention is in part the provision of a binding that is produced from paper. Thus the binding itself is subject to recycling and is simply thrown into the vat with the scrap paper to be recycled in the conventional manner. The paper binding enables the elimination of the prior steps of cutting the binding prior to placing it in the vat (thus reducing safety and maintenance problems) and the gathering and disposal of the binding.

The inventors conducted major research and development to find the desired paper binding and none could be found. The closest was a binding used in fields for growing hops. The hop binding is a 3/16" diameter cord and was shown to withstand moisture and it was surprisingly strong. Making the cord sufficiently strong to withstand a 1,200 pound compressed bale of paper was a different matter. Whereas a 3" width strip of wet lap paper is used for the hop binding, it was ultimately learned that a width on the order of 8" was required for the baled paper. Twisting machines could not handle the greater width and the paper twisting machines had to be modified.

With reference to FIG. 2, the process of the present invention involves the gathering of scrap paper 10 and compressing the paper in a conventional press 12 to be formed into a compressed bale 14 (FIG. 2A), wrapping the compressed bale with the improved paper cord 16, hauling the cord wrapped bales 14 to a pulp recycling plant (FIG. 2C) and conveying the bales, e.g., on a conveyor 18 directly into the pulp processing vats 18. The heat, water, agitation and perhaps the chemical used for pulping dissolves the incoming bales including the paper cord. In the dissolved state, the bales in total, cord and all, are reduced to pulp and the disadvantages in handling wire heretofore explained is eliminated.

FIG. 3 schematically illustrates the twisting process and machinery used for producing the paper cord. U.S. grade wet lap Kraft paper (45 pound weight) having a width of e.g., 8" to 11" (Ref. 20) is fed into a bell shape drum 22. The drum twists the paper as indicated in FIGS. 3 and 4 to tightly wrap the paper strip into a cord form that has a consistently smooth outer surface with a diameter of 1/4" to 5/16".

Whereas similar equipment has been used to twist wet lap paper strips of 3" width into cords 3/16" in diameter, this similar but prior equipment was unable to wrap the wider paper satisfactorily. It was necessary to enlarge the bell mouth of the drum to enable a smooth folding of the greater width into the tightly twisted cord form. As produced with the modified machinery, the cord was found to be acceptably smooth and to withstand a tensile pull test in excess of 250 pounds. A tensile strength of 200 pounds is considered minimal and upwards of 300 pounds desirable. In a production run of the cord, an 8" width wet lap paper was twisted into a 1/4" diameter cord and achieved a test strength, on a paper bale, of 275 pounds.

It is considered desirable to generate a smooth exterior surface on the cord, i.e., with no nicks or protruding edges. Such nicks and edges can undesirably affect the wrapping process, i.e., wrapping of the scrap paper bales, and often these nicks and protruding edges indicate a weakness whereat the cord may break.

Whereas wet lap paper cord has been produced and used for tying hops, there has never been a known need or use of the cord where greater strength was required. Wire has been considered the binding of choice where greater strength was required and has been the binding previously used for recycled paper bales of 1,000 to 2,000 pounds. The inventors determined that the considerable disadvantages of wire could be avoided if the baling could be achieved by paper cord. Paper cord was successfully produced at the desired strength and such has enabled the simplification of the recycling process as described herein. Those skilled in the art will likely conceive of further modifications to the process resulting in additional advantages and, of course, the manner by which the bales are conveyed to a pulp mill and the type of pulp mill employed is not considered to be a limitation for this invention. Such modifications are considered within the scope of the invention which is defined in the appended claims.

The invention claimed is:

1. A method for recycling used recyclable paper which comprises:

producing compressed bales of recyclable paper products having a weight in the order of about 1,000 pounds and greater;

binding the bales with a binding consisting essentially of strips of wet lap paper twisted into a taut cord form that resists moisture penetration;

conveying the bales to a pulp processing vat where the bales and binding are subjected to pulping chemicals;

dissolving the wet lap paper binding in the pulping chemical for release of the paper product; and processing the combination of paper product and paper binding into pulp for recycling.

2. A method as defined in claim 1 which further comprises forming said binding form strips of at least about 8 inches in width that produces a tensile strength for said binding of at least about 200 pounds.

3. A bale of recyclable paper for recycling in a pulp mill, said bale bound by a binding, the combination comprising:

said binding including strips of elongate wet lap paper tightly twisted into a cylindrical cord form and as formed consisting substantially entirely of twisted wet lap paper;

said bale compressed and having a weight in the order of about 1,000 pounds and greater and as compressed wrapped with said twisted paper cord form to render said cord form in a taut condition and resisting moisture penetration into the cord form;

said twisted cord form when subjected to pulping chemicals for pulping the paper of the bale readily dissolving resulting in release of the paper from the bale, the paper of the bale and the paper of the binding together being recycled in the pulping process.

4. A bale as defined in claim 3 wherein the elongate strips of wet lap paper have a width in the range of about 8 inches and greater.

5. A bale as defined in claim 4 wherein the cylindrical cord is in the order of about 0.25 inch and greater and has tensile strength of about 200 plus pounds.

6. A bale as defined in claim 5 wherein the bale has a moisture content of no greater than about 12%, the width of the strip is between about 8 inches and 11 inches and the diameter of the cord form is between ¼ inch and ⅝ inch.

* * * * *